(12) United States Patent
Hwang et al.

(10) Patent No.: US 7,734,087 B2
(45) Date of Patent: Jun. 8, 2010

(54) FACE RECOGNITION APPARATUS AND METHOD USING PCA LEARNING PER SUBGROUP

(75) Inventors: Wonjun Hwang, Seoul (KR); Taekyun Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1014 days.

(21) Appl. No.: 11/002,082

(22) Filed: Dec. 3, 2004

(65) Prior Publication Data

US 2005/0123202 A1 Jun. 9, 2005

(30) Foreign Application Priority Data

Dec. 4, 2003 (KR) ...................... 10-2003-0087767

(51) Int. Cl.
*G06K 9/62* (2006.01)
*G06K 9/00* (2006.01)
*G06K 9/50* (2006.01)
*G06K 9/56* (2006.01)

(52) U.S. Cl. ...................... 382/159; 382/155; 382/160; 382/117; 382/118; 382/201; 382/205

(58) Field of Classification Search .................. 382/115, 382/117, 118, 155, 159, 160, 201, 205, 255
See application file for complete search history.

(56) References Cited

U.S. PATENT DOCUMENTS

| | | | | |
|---|---|---|---|---|
| 5,586,033 A * | 12/1996 | Hall | ............................. | 701/50 |
| 6,185,337 B1 * | 2/2001 | Tsujino et al. | ............... | 382/227 |
| 6,442,519 B1 * | 8/2002 | Kanevsky et al. | ............ | 704/243 |
| 6,892,189 B2 * | 5/2005 | Quass et al. | ................... | 706/12 |
| 7,027,620 B2 * | 4/2006 | Martinez | ..................... | 382/118 |
| 7,123,783 B2 * | 10/2006 | Gargesha et al. | ............ | 382/308 |
| 7,269,292 B2 * | 9/2007 | Steinberg | ..................... | 382/243 |

(Continued)

OTHER PUBLICATIONS

Belhumeur, Peter N., Joao P. Hespanha, and David J. Kriegman. "Eigenfaces vs. Fisherfaces: Recognition Using Class Specific Linear Projection." IEEE Transactions on Pattern Analysis and Machine Intelligence 19-7(1997): 711-719.*

(Continued)

*Primary Examiner*—Matthew C Bella
*Assistant Examiner*—Michael A Newman
(74) *Attorney, Agent, or Firm*—Staas & Halsey LLP

(57) ABSTRACT

A face recognition apparatus and method using Principal Component Analysis (PCA) learning per subgroup, the face recognition apparatus includes: a learning unit which performs Principal Component Analysis (PCA) learning on each of a plurality of subgroups constituting a training data set, and then performs Linear Discriminant Analysis (LDA) learning on the training data set, thereby generating a PCA-based LDA (PCLDA) basis vector set of each subgroup; a feature vector extraction unit which projects a PCLDA basis vector set of each subgroup to an input image and extracts a feature vector set of the input image with respect to each subgroup; a feature vector storing unit which projects a PCLDA basis vector set of each subgroup to each of a plurality of face images to be registered, thereby generating a feature vector set of each registered image with respect to each subgroup, and storing the feature vector set in a database; and a similarity calculation unit which calculates a similarity between the input image and each registered image.

21 Claims, 7 Drawing Sheets

U.S. PATENT DOCUMENTS

| | | | |
|---|---|---|---|
| 2002/0136433 A1* | 9/2002 | Lin | 382/118 |
| 2003/0172284 A1* | 9/2003 | Kittler | 713/186 |
| 2003/0210139 A1* | 11/2003 | Brooks et al. | 340/531 |
| 2004/0076329 A1* | 4/2004 | Skarbek et al. | 382/224 |

OTHER PUBLICATIONS

Kim, Tae-Kyun, Hyunwoo Kim, Wonjun Hwang, and Seok Cheol Kee, Jong Ha Lee. "Component-based LDA Face Descriptor for Image Retrieval." 13th British Machine Vision Conference, Proceedings. (2002): 507-515.*

Kim et al. "Component-based LDA Face Descriptor for Image Retrieval." 13th British Machine Vision Conference, Proceedings. (2002): 507-515.*

K. Fukunaga, "Introduction to Statistical Recognition," *Academic Press*, 2nd Ed., 1990, pp. 441-467.

Kim T., et al., "Face Description Based on Decomposition and Combining of a Facial Space with LDA," International Conference on Image Processing, Sep. 2003.

* cited by examiner

US 7,734,087 B2

FACE RECOGNITION APPARATUS AND METHOD USING PCA LEARNING PER SUBGROUP

CROSS-REFERENCE TO RELATED APPLICATION

This application claims the priority of Korean Patent Application No. 2003-87767, filed on Dec. 4, 2003 in the Korean Intellectual Property Office, the disclosure of which is incorporated herein by reference.

BACKGROUND OF THE INVENTION

1. Field of the Invention

The present invention relates to face recognition, and more particularly, to a Linear Discriminant Analysis (LDA) based face recognition apparatus and method using Principal Component Analysis (PCA) learning per subgroup.

2. Description of the Related Art

Face recognition is used to identify at least one person whose face is present in a still or moving picture using a given face database (DB). Since face image data greatly changes according to a person's pose or illumination, it is difficult to classify pose data or illumination data with respect to the same identity into the same class. Accordingly, a high-accuracy classification method is required. Usually, PCA and LDA which are sub-space analysis methods and Support Vector Machine (SVM) are used as an algorithm for a classification operation. A classification method using SVM has been highlighted due to excellent recognition performance. However, since a face image has several hundreds of bytes computation within the SVM is complicated, and complexity is high. Moreover, since binary decision is used, the method using the SVM cannot be used for large-capacity face recognition. Alternatively, when a sub-space analysis method is used, a size of a face image can be reduced from several hundreds of bytes to several tens of bits. Thus, complexity can be decreased. Among sub-space analysis methods, PCA is an unsupervised learning algorithm and provides satisfactory recognition performance compared to internal complexity, and thus is widely spread in a field of initial face recognition. LDA is a method for distinctly discriminating groups indicating different identities. The LDA uses a transform matrix which maximizes a variance between images included in different groups and minimizes a variance between images included in the same group. The LDA is described in detail in "Introduction to Statistical Pattern Recognition" [Fukunaga, K. Academic Press, 2nd ed., 1990].

Recently, PCA-based LDA (referred to as PCLDA) has been developed. The PCLDA is a supervised learning algorithm and has advantages of sub-space analysis and as high recognition performance as the SVM, and therefore, the PCLDA is widely used for face recognition. The PCLDA is described in detail by P. N. Belhumeur, J. P. Hespanha, and D. J. Kriegman ["Eigenface vs. Fisher Faces: Recognition Using Class Specific Linear Projection", IEEE Trans. PAMI, Vol. 19, No. 7, pp. 711-720, July, 1997].

However, the above-described conventional methods have the following problems. Firstly, to increase recognition performance, a large capacity of a training data set is constructed and used. Since it is difficult to obtain a large capacity of a training data set, data sets having different characteristics are mixed. In this situation, specific characteristics of the data sets cannot be properly reflected in a learning process, which may deteriorate performance.

Secondly, in designing a face recognition system using a conventional method, a learned basis vector expresses only current characteristics of a data set during a learning process but does not properly express characteristics and features of a place where the face recognition system is actually installed and used. For example, face images photographed under normal illumination are usually used in a leaning process when face recognition systems are designed. However, since the face recognition systems are usually used at the common front doors of apartment buildings or the entrances of office rooms, illumination conditions of installation places are different from those used to obtain the face images for the leaning process. To obtain the face images for the leaning process under the same illumination conditions as the actual illumination conditions, a large amount of equipment investment is required. To overcome this problem, a method of performing a learning process using face images directly obtained at an installation place may be used. However, when a face recognition system is installed at a place such as a personal house where users are not many, it is difficult to obtain learning data of a satisfactory level. Even though users' face images are collected at such place, due to a small number of users, conventional learning methods may not be used.

To overcome the above problems, local face images, which are directly registered by users at an actual installation place of a face recognition system, and global face images, which are registered in the face recognition system in advance under a situation covering most of various environments, may be used together. In this case, a face recognition system may provide reliable performance even when a small number of users exist. However, since the number of global face images is usually greater than the number of local face images or the global face images have more characteristics than the local face images, the problem firstly mentioned in the above description occurs. As a result, a face recognition system cannot be optimized to an installation place.

SUMMARY OF THE INVENTION

According to an aspect of the present invention, there is provided an apparatus and method extracting a feature vector set in which the feature vector set can effectively reflect specific characteristics of each subgroup regardless of a data size of a subgroup and is not over fitted to learning data of each subgroup.

According to an aspect of the present invention, there is also provided a face recognition apparatus and method recognizing an input face image using PCLDA basis vector set of each subgroup.

According to an aspect of the present invention, there is also provided a face recognition apparatus and method optimized to an installation place.

According to an aspect of the present invention, there is provided an apparatus extracting a feature vector, including: a data classifier which classifies a training data set into a plurality of subgroups; a Principal Component Analysis (PCA) learning unit which performs PCA learning on each of the subgroups to generate a PCA basis vector set of each subgroup; a projection unit which projects a PCA basis vector set of each subgroup to the whole training data set; a Linear Discriminant Analysis (LDA) learning unit which performs LDA learning on a training data set resulting from the projection to generate a PCA-based LDA (PCLDA) basis vector set of each subgroup; and a feature vector extraction unit which projects a PCLDA basis vector set of each subgroup to an input image and extracts a feature vector set of the input image with respect to each subgroup.

According to another aspect of the present invention, there is provided a method of extracting a feature vector, including: classifying a training data set into a plurality of subgroups; performing Principal Component Analysis (PCA) learning on each of the subgroups to generate a PCA basis vector set of each subgroup; projecting a PCA basis vector set of each subgroup to the whole training data set and performing Linear Discriminant Analysis (LDA) learning on a result of the projection to generate a PCA-based LDA (PCLDA) basis vector set of each subgroup; and projecting a PCLDA basis vector set of each subgroup to an input image and extracting a feature vector set of the input image with respect to each subgroup.

According to still another aspect of the present invention, there is provided a face recognition apparatus including: a learning unit which performs Principal Component Analysis (PCA) learning on each of a plurality of subgroups constituting a training data set, and then performs Linear Discriminant Analysis (LDA) learning on the whole training data set, thereby generating a PCA-based LDA (PCLDA) basis vector set of each subgroup; a feature vector extraction unit which projects a PCLDA basis vector set of each subgroup to an input image and extracts a feature vector set of the input image with respect to each subgroup; a feature vector storing unit which projects a PCLDA basis vector set of each subgroup to each of a plurality of face images to be registered, thereby generating a feature vector set of each registered image with respect to each subgroup, and storing the feature vector set in a database; and a similarity calculation unit which calculates a similarity between the input image and each registered image.

According to still another aspect of the present invention, there is provided a face recognition method including: performing Principal Component Analysis (PCA) learning on each of a plurality of subgroups constituting a training data set, and then performing Linear Discriminant Analysis (LDA) learning on the training data set, thereby generating a PCA-based LDA (PCLDA) basis vector set of each subgroup; projecting the PCLDA basis vector set of each subgroup to an input image and extracting a feature vector set of the input image with respect to each subgroup; projecting the PCLDA basis vector set of each subgroup to each of a plurality of registered images, thereby generating a feature vector set of each registered image with respect to each subgroup, and storing the feature vector set in a database; and calculating a similarity between the input image and each registered image.

Preferably, but not necessarily, the method of extracting a feature vector and the face recognition method may be implemented in a computer-readable recording medium which stores a program for performing the methods on a computer.

Additional aspects and/or advantages of the invention will be set forth in part in the description which follows and, in part, will be obvious from the description, or may be learned by practice of the invention.

BRIEF DESCRIPTION OF THE DRAWINGS

These and or other aspects and advantages of the present invention will become more apparent and more readily appreciated from the following description of the embodiments, taken in conjunction with the accompanying drawings of which.

DETAILED DESCRIPTION OF THE EMBODIMENTS

Figure 1:
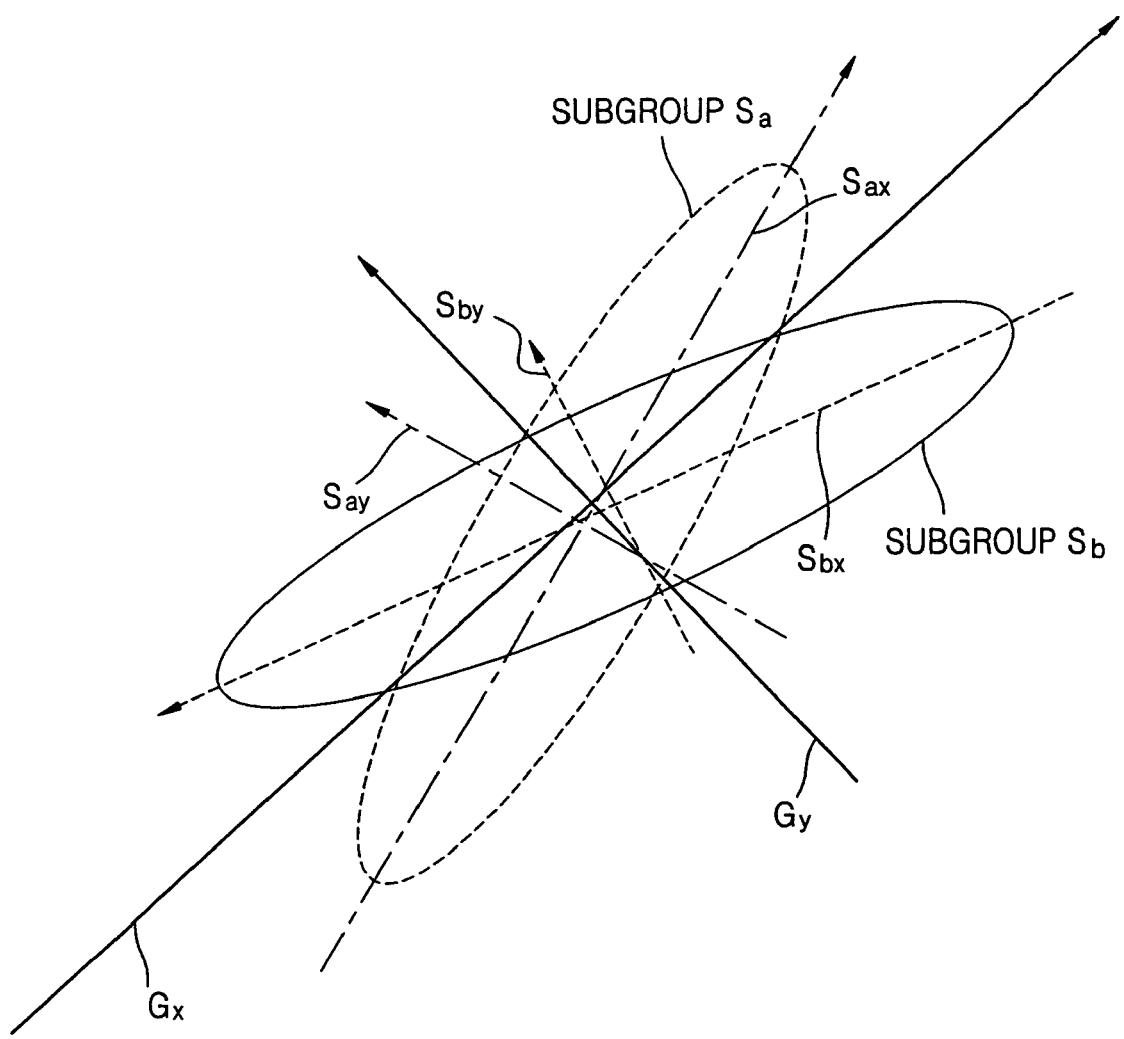
FIG. 1 illustrates a basis vector set generated using conventional Principal Component Analysis (PCA) learning and a basis vector set generated using PCA learning on each subgroup according to an aspect of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 illustrates global basis axes $G_x$ and $G_y$ generated by performing Principal Component Analysis (PCA) learning on an entire training data set and local basis axes $S_{ax}$, $S_{ay}$, $S_{bx}$, and $S_{by}$ generated by performing PCA learning on each of two subgroups $S_a$ and $S_b$ according to an aspect of the present invention. Referring to FIG. 1, the global basis axes $G_x$ and $G_y$ do not properly reflect different characteristics of the subgroups $S_a$ and $S_b$. Here, the training data set may include only global face images or further include local face images.

Figure 2:
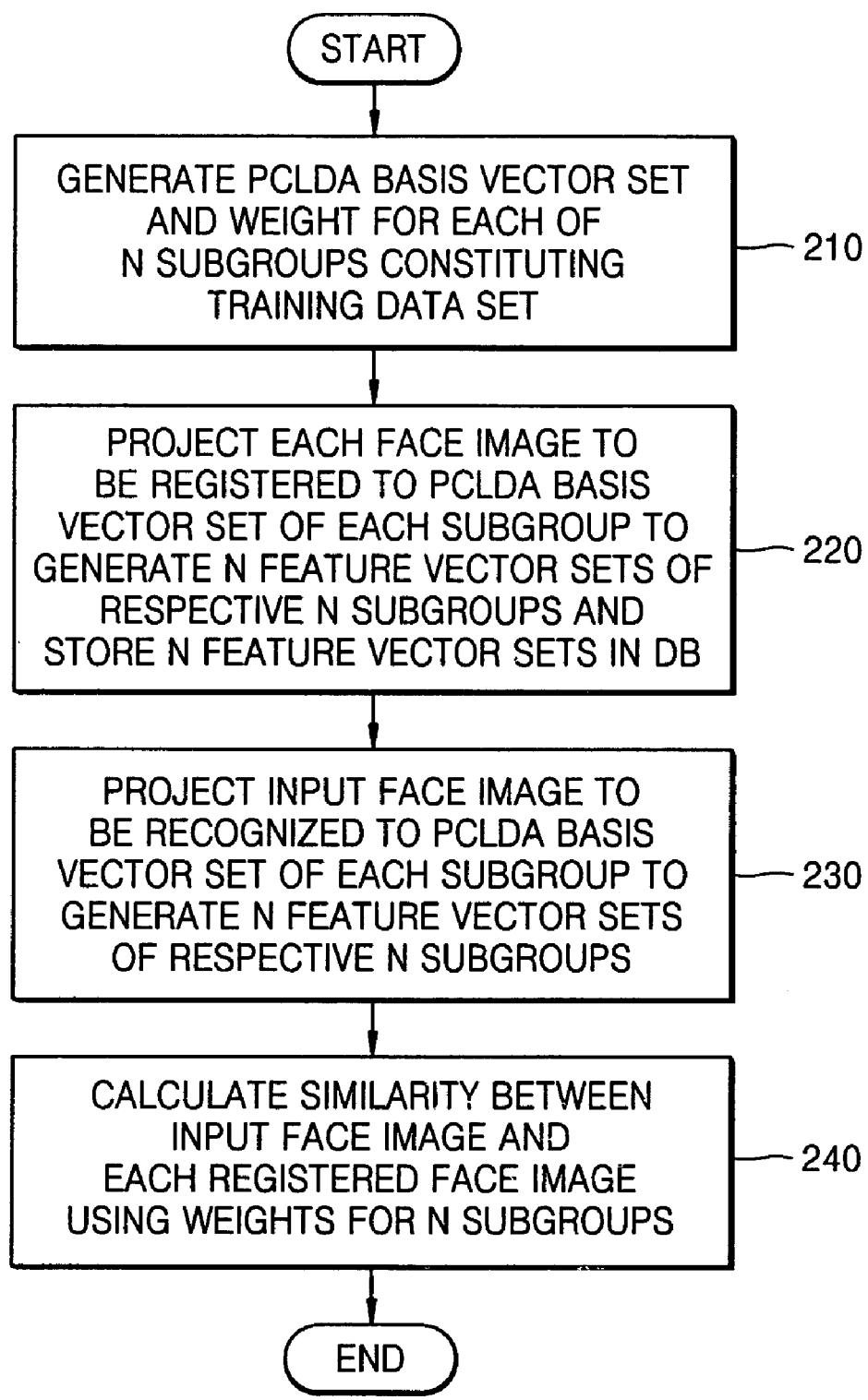
FIG. 2 is a flowchart of a face recognition method according to an embodiment of the present invention.

FIG. 2 is a flowchart of a face recognition method according to an embodiment of the present invention. Referring to FIG. 2, in operation 210, PCA learning is performed on each of N subgroups constituting a training data set, a PCA basis vector set of each subgroup is projected to the training data set, and then Linear Discriminant Analysis (LDA) learning is performed on a result of the projection to generate a PCA-based LDA (PCLDA) basis vector set of each subgroup. Each subgroup is defined to include data sets having similar characteristic changes such as, for example, a pose change or illumination change. Fundamentally, a subgroup may be defined based on similar characteristics of face images using k-nearest neighbor (k-NN) classification.

Usually, in an installation place where only a small number of users are present, since a singularity problem occurs in a rank of a scatter matrix, LDA learning is impossible. In this case, global face images may be included in a training data set. However, since a data size of global face images is usually much greater than that of local face images collected at the installation place, characteristics of global face images may be reflected a lot while information of local face images may be ignored. To overcome this problem, in an embodiment of the present invention, a local face image may be defined as a single subgroup in an installation place where only a small number of users are present so that information of local face images is preserved, and global face images may be classified into a plurality of subgroups according to similar characteristic changes. In this situation, PCA learning is performed on each subgroup, thereby generating a basis vector set of each subgroup, which properly reflects characteristics of each subgroup. Thereafter, the basis vector set of each subgroup is projected to an entire training data set. Next, LDA learning is performed on a result of the projection performed with respect to each of the N subgroups to generate N PCLDA basis vector sets.

In operation 220, each of a plurality of face images to be registered is projected to each of the N PCLDA basis vector sets generated in operation 210 to generate N feature vector sets of the respective N subgroups, and the N feature vector sets are stored in a database (DB). In other words, when N subgroups are present, N feature vector sets are generated per registered image.

In operation 230, an input face image to be recognized or retrieved is projected to the N PCLDA basis vector sets, generated for the respective N subgroups in operation 210, to generate N feature vector sets of the respective N subgroups. Similarly, when N subgroups are present, N feature vector sets are generated per input image.

In operation 240, a similarity between the input image and each of registered images stored in the DB is calculated. To calculate the similarity between the input image and each registered image, similarities between features vector sets of the input image and a single registered image are calculated by subgroups. Next, a weight for each subgroup is multiplied by a similarity corresponding to the subgroup. Next, all of the results of multiplications are added up, thereby obtaining the final similarity between the input image and the single registered image. When the input image, the single registered image, and the final similarity are respectively represented by "α", "β", and $S_t(\alpha,\beta)$, the final similarity can be expressed by Equation (1).

$$S_t(\alpha, \beta) = \sum_{i=1}^{N} K_i S_i(\alpha, \beta) \quad (1)$$

Here, $K_i$ indicates a weight for an i-th subgroup, $$\sum_{i=1}^{N} K_i = 1,$$

and $S_i(\alpha,\beta)$ indicates a similarity between a feature vector set $y_i(\alpha)$ of the input image α and a feature vector set $y_i(\beta)$ of the registered image β with respect to the i-th subgroup. When the similarity between feature vector sets of the input image and the registered image with respect to each subgroup is calculated using, for example, a Euclidean distance, the similarity can be expressed by Equation (2).

$$S_i(\alpha,\beta)=\|y_i(\alpha)-y_i(\beta)\| \quad (2)$$

Various subsequent operations such as authentication, recognition, and retrieval can be performed using final similarities between the input image and the individual registered images, which are calculated in operation 240.

Figure 3:
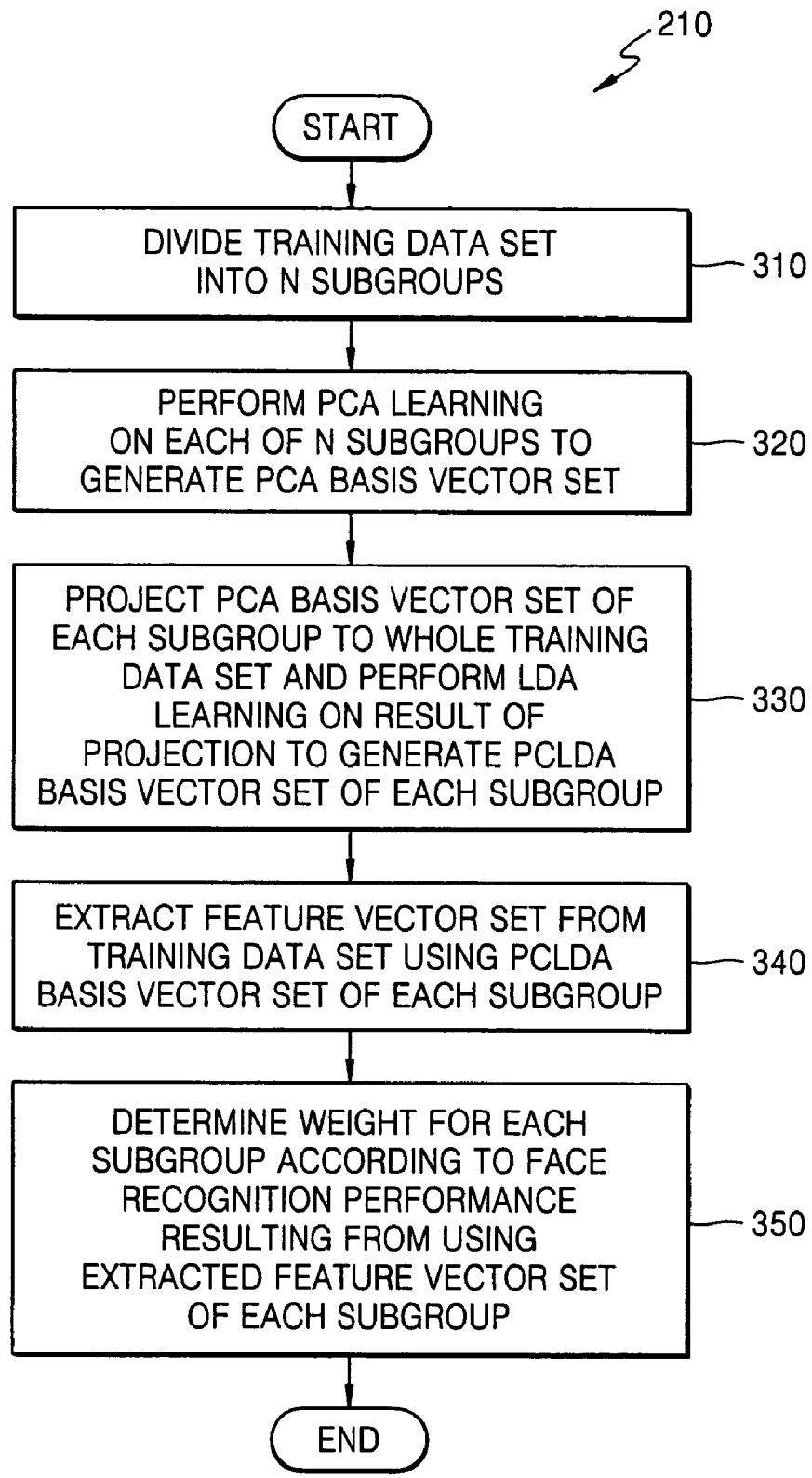
FIG. 3 is a detailed flowchart of operation 210 shown in FIG. 2.

FIG. 3 is a detailed flowchart of operation 210, which can be referred to as a pre-learning operation, shown in FIG. 2. Referring to FIG. 3, in operation 310, the training data set is divided into N subgroups (where N is 2 or an integer greater than 2). A single subgroup includes data sets having similar characteristic changes. For example, in the embodiment of the present invention, the training data set may be divided into two subgroups: one subgroup including data sets based on an illumination change; and the other subgroup including data sets based on a pose change. The illumination change and the pose change significantly deteriorate face recognition performance and show very different characteristics from each other. For example, in the illumination change, brightness of a face surface changes while a face pose rarely changes. In the pose change, a face figure changes a lot due to a motion of a face while illumination rarely changes.

In operation 320, PCA learning is individually performed on the N subgroups to generate PCA basis vector sets $U_i$ of the respective N subgroups. The PCA basis vector sets $U_i$ of each subgroup can be derived from Equation (3).

$$\Sigma_i U_i = U_i \Lambda_i \quad (3)$$

Here, "i" indicates a subgroup number among 1 through N, $\Sigma_i$ indicates a covariance matrix of the i-th subgroup, and $\Lambda_i$ indicates an eigenvalue matrix. Accordingly, a PCA linear transformation function can be defined by Equation (4).

$$\alpha_i = U_i^T(x-\mu_i) \quad (4)$$

Here, $\alpha_i$ indicates a PCA projected vector set of the i-th subgroup, $\mu_i$ indicates an average vector of the i-th subgroup, and "x" indicates an input face image vector. For each of the N subgroups, an optimized basis vector set $U_i$ can be obtained. Each subgroup's basis vector set is reduced a dimension as compared to an input face image vector set.

In operation 330, the basis vector set $U_i$ of each subgroup is projected to the whole training data set, and LDA learning is performed on a result of projection. An LDA basis vector set $W_i$ generated as a result of LDA learning with respect to each subgroup can be expressed by Equation (5).

$$W_i = \arg\max_W \frac{W_i^T S_B' W_i}{W_i^T S_W' W_i} = \arg\max_W \frac{W_i^T (U_i^T S_B U_i) W_i}{W_i^T (U_i^T S_W U_i) W_i} \quad (5)$$

Here, $S_B$ and $S_W$ respectively indicate a between-classes scatter matrix and a within-classes scatter matrix with respect to the training data set and can be expressed by Equation (6).

$$S_B = \sum_{c=1}^{C} M_c [\mu_c - \mu][\mu_c - \mu]^T \quad (6)$$

$$S_W = \sum_{c=1}^{C} \sum_{x \in \chi_c} [x - \mu_c][x - \mu_c]^T$$

When the training data set includes C classes, "x" indicates a data vector corresponding to a component of a c-th class $\chi_c$, and the c-th class $\chi_c$ includes $M_c$ data vectors, $\mu_c$ indicates an average vector of the c-th class $\chi_c$, and μ indicates an average vector of the training data set.

A PCLDA basis vector set $B_i$ of the i-th subgroup, which is obtained by sequentially performing PCA learning and LDA learning, that is, by performing PCLDA learning, can be expressed by Equation (7)

$$B_i = U_i W_i \quad (7)$$

In operation 340, a feature vector set $y_i$ of a face image among the training set is extracted using the PCLDA basis vector set $B_i$ of the i-th subgroup obtained in operation 330. The feature vector set $y_i$ can be expressed by Equation (8).

$$y_i(x) = (U_i W_i)^T (x-\mu_i) = B_i^T(x-\mu_i) \quad (8)$$

Here, "x" indicates the input face image vector. As described above, when the PCLDA basis vector set $B_i$ is used, LDA learning is performed on the training data set, not on each subgroup subjected to PCA learning, so that a PCA projected vector set of an arbitrary subgroup can be used with respect to other subgroups, thereby solving an over fitting problem.

When there is no special request from a user, in operation 350, face recognition is simulated by applying a feature vector set extracted with respect to each subgroup in operation 340 to the training data set, and a weight to be allocated to each subgroup is determined according to recognition performance obtained as a result of the simulation.

In another embodiment of the present invention, a weight for each subgroup can be appropriately determined to a user's purpose. For example, when a user allocates a higher weight to a subgroup including a local face image than to a subgroup including a global face image in a small-scale installation place, a face recognition system operates laying stress on local face images, and therefore, subgroups including global face images are just subordinately used to determine general characteristics of a face image. As a result, the face recognition system is optimized to the installation place and has very accurate recognition performance. However, when the user does not particularly set weights for respective subgroups, the weights for the respective subgroups are determined using face images used during learning. In this case, since no advance information is present, the face recognition system determines based on face recognition performance of each subgroup what subgroups are more similar to characteristics of a face image obtainable in the installation place on the assumption that learned data has similar characteristics to the face image obtainable in the installation place, and allocates a weight to each subgroup according to a result of the determination.

Figure 4:
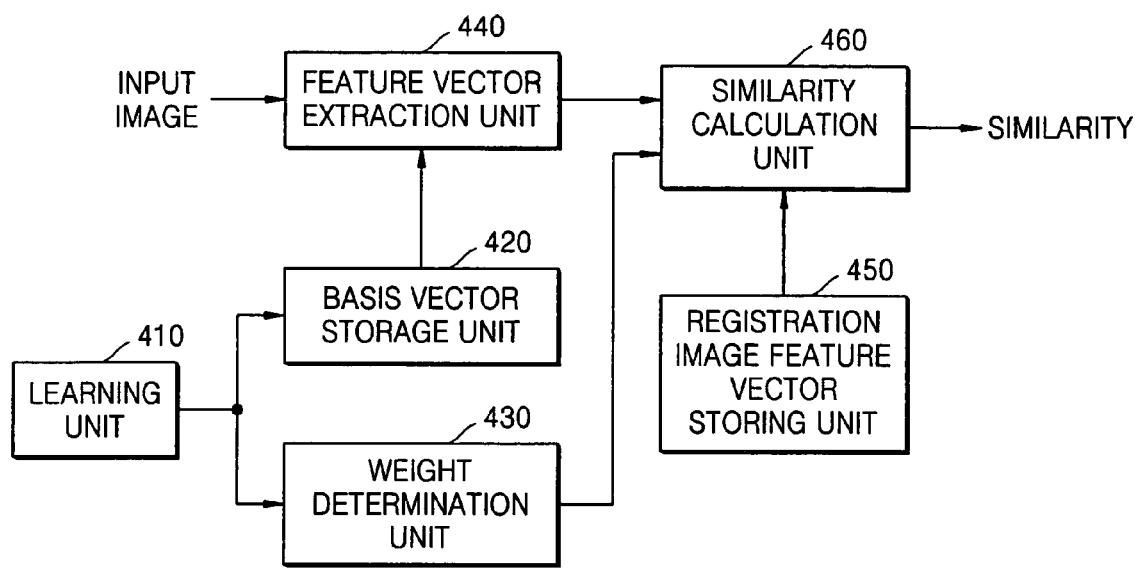
FIG. 4 is a block diagram of a face recognition apparatus according to an embodiment of the present invention.

FIG. 4 is a block diagram of a face recognition apparatus according to an embodiment of the present invention. The face recognition apparatus includes a learning unit 410, a basis vector storage unit 420, a weight determination unit 430, a feature vector extraction unit 440, a feature vector storing unit 450, and a similarity calculation unit 460.

Referring to FIG. 4, the learning unit 410 performs PCA learning on each of N subgroups forming a training data set, then projects a PCA basis vector set of each subgroup to the training data set, and then performs LDA learning on a result of projection, thereby generating a PCLDA basis vector set of each subgroup.

The basis vector storage unit 420 stores the PCLDA basis vector set of each subgroup generated by the learning unit 410.

The weight determination unit 430 simulates face recognition using a feature vector set extracted from the training data set using the PCLDA basis vector set of each subgroup generated by the learning unit 410 and determines a weight for each subgroup according to face recognition performance obtained from the simulation. Here, a weight for each subgroup is determined using trial and error based on face recognition performance of the subgroup. For example, when a class identification value for each subgroup is calculated from the training data set, a weight for the subgroup may be determined to be proportional to the class identification value. Such method of determining a weight for each subgroup is described in detail by T. Kim, H. Kim, W. Hwang, S. Kee, and J. Kittler ["Face Description Based on Decomposition and Combining of a Facial Space with LDA", International Conference on Image Processing, Spain, September 2003].

The feature vector extraction unit 440 projects a PCLDA basis vector set of each subgroup generated by the learning unit 410 to an input image and extracts a feature vector set of the input image with respect to each subgroup.

The feature vector storing unit 450 projects a PCLDA basis vector set of each subgroup generated by the learning unit 410 to each registered image, extracts a feature vector set of the registered image with respect to each subgroup, and stores the feature vector set.

The similarity calculation unit 460 calculates a similarity between the input image and each registered image. To calculate this similarity, the similarity calculation unit 460 calculates with respect to each subgroup a similarity between a feature vector set of the input image provided from the feature vector extraction unit 440 and a feature vector set of each registered image stored in the registered image feature vector storing unit 450, then respectively multiplies similarities regarding the respective subgroups by weights determined by the weight determination unit 430 for the respective subgroups, and then adds up results of the multiplication, thereby calculating the final similarity between the input image and the registered image.

Figure 5:
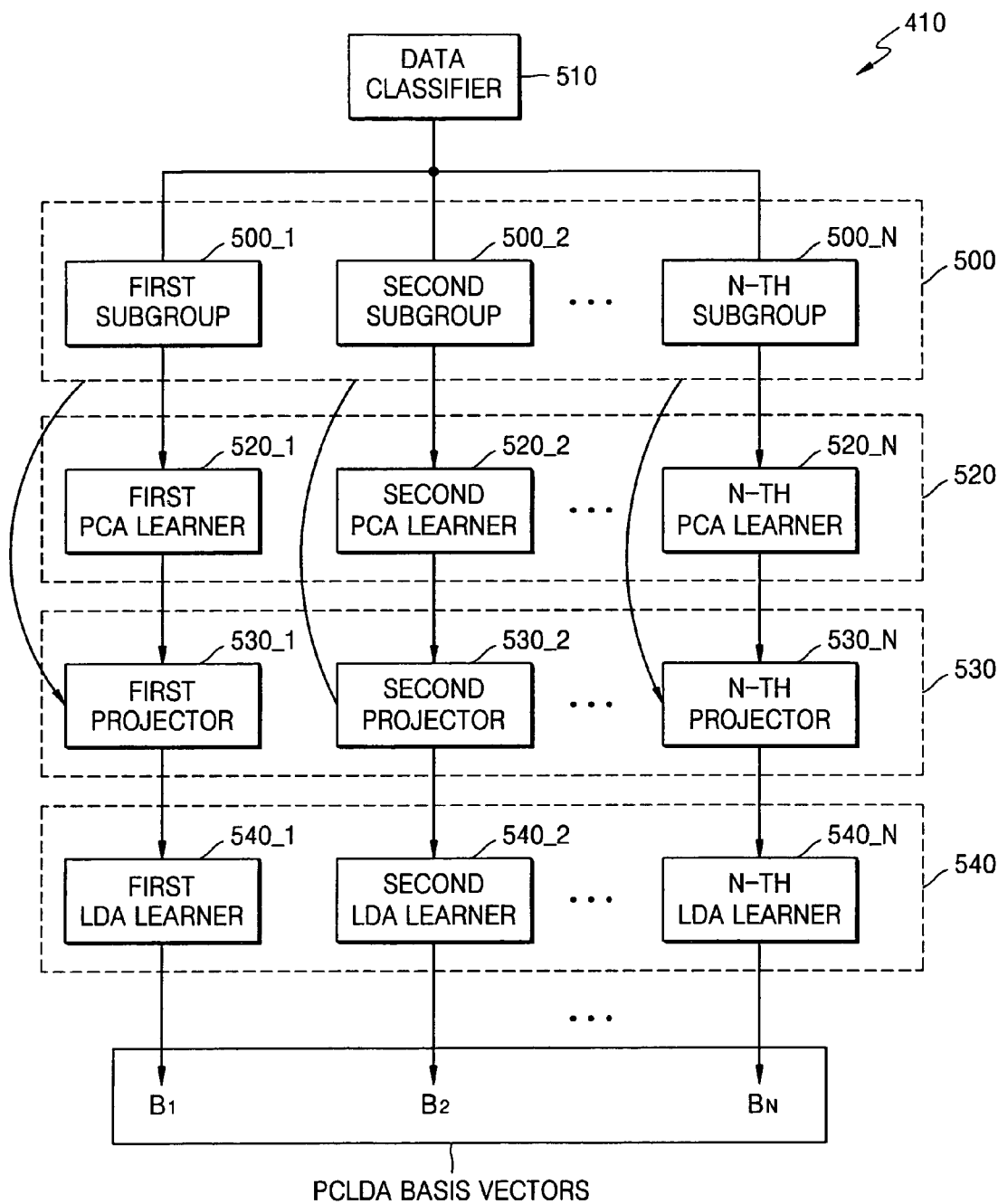
FIG. 5 is a detailed block diagram of a learning unit shown in FIG. 4.

FIG. 5 is a detailed block diagram of the learning unit 410 shown in FIG. 4. The learning unit 410 includes a data classifier 510, a PCA learning unit 520, a projection unit 530, and an LDA learning unit 540. The PCA learning unit 520 includes first through N-th PCA learners 520_1, 520_2, and 520_N corresponding to respective N subgroups 500_1, 500_2, and 500_N. The projection unit 530 includes first through N-th projectors 530_1, 530_2, and 530_N corresponding to the respective N subgroups 500_1, 500_2, and 500_N. The LDA learning unit 540 includes first through N-th LDA learners 540_1, 540_2, and 540_N corresponding to the respective N subgroups 500_1, 500_2, and 500_N.

Referring to FIG. 5, the data classifier 510 classifies a training data set 500 including a plurality of data sets into the first through N-th subgroups 500_1, 500_2, and 500_N. When the training data set 500 has a large capacity like a global data set, the training data set 500 may be classified based on similar characteristic changes, for example, into a data set having a pose change and a data set having an illumination change. However, when the training data set 500 includes both a global data set and a local data set, the training data set 500 may be classified into a global data set having a pose change, a global data set having an illumination change, and a local data set. A global data set is obtained from a widely known DB such as ALTKOM or XM2VTS, and a local data set is obtained in an installation place by a face recognition apparatus according to an embodiment of the present invention. A global data set usually includes data, which can be easily obtained, in order to improve face recognition performance. Accordingly, when a large amount of a global data set is used for learning, face recognition performance increases. Therefore, a large amount of a global data set is usually used. Conversely, a local data set has a smaller size than a global data set. For example, a global data set usually includes 3,000 through 30,000 face images, but a local data set includes just 500 through 1,000 face images.

The first through N-th PCA learners 520_1, 520_2, and 520_N respectively perform PCA learning on the first through N-th subgroups 500_1, 500_2, and 500_N to generate PCA basis vector sets of the respective first through N-th subgroups 500_1, 500_2, and 500_N.

The first through N-th projectors 530_1, 530_2, and 530_N respectively project the PCA basis vector sets of the respective first through N-th subgroups 500_1, 500_2, and 500_N to the training data set 500.

The first through N-th LDA learners 540_1, 540_2, and 540_N respectively perform LDA learning on training data sets obtained as results of the projections respectively performed by the first through N-th projectors 530_1, 530_2, and 530_N to generate first through N-th PCLDA basis vector sets $B_1, B_2,$ and $B_N$.

In order to estimate performance of a face recognition method of the present invention, 1,600 face images obtained from the DBs Purdue and PIE were used to form a training data set and a test data set for a subgroup based on an illumination change. 1,600 face images obtained from the DBs ALTKOM and XM2VTS were used to form a training data set and a test data set for a subgroup based on a pose change. 400 face images obtained from the DB BANCA were used to form a test data set in order to check over fitting of a training data set and a face recognition rate over time.

TABLE 1

| DB | Number of face images | Training set | Test set | Change type |
|---|---|---|---|---|
| Purdue | 920 | 460 | 460 | Illumination and facial expression |
| PIE | 680 | 340 | 340 | Illumination |
| ALTKOM | 800 | 400 | 400 | Pose and illumination |
| XM2VTS | 800 | 400 | 400 | Pose |
| BANCA | 400 | — | 400 | Illumination and time |

Table 2 shows results of face recognition under the experiment (EXP) environment described in Table 1.

TABLE 2

| Unit | Illumination change based data set | | Pose change based data set | | Outdoor | |
|---|---|---|---|---|---|---|
| (ANMRR) | Purdue | PIE | ALTKOM | XM2VTS | BANCA | Total |
| EXP1 | 0.350 | 0.037 | 0.480 | 0.686 | 0.620 | 0.444 |
| EXP2 | 0.686 | 0.326 | 0.378 | 0.612 | 0.677 | 0.547 |
| EXP3 | 0.349 | 0.030 | 0.680 | 0.844 | 0.636 | 0.517 |
| EXP4 | 0.322 | 0.042 | 0.440 | 0.664 | 0.591 | 0.420 |
| EXP5 | 0.368 | 0.043 | 0.521 | 0.697 | 0.640 | 0.464 |
| EXP6 | 0.315 | 0.038 | 0.441 | 0.657 | 0.594 | 0.417 |

In Table 2, EXP1 indicates a conventional face recognition method in which PCA learning and LDA learning are performed on an entire training data set. EXP2 indicates a conventional face recognition method in which PCA learning and LDA learning are performed only on the pose change based data sets, ALTKOM and XM2VTS. EXP3 indicates a conventional face recognition method in which PCA learning and LDA learning are performed only on the illumination change based data sets, Perdue and PIE. EXP4 indicates a face recognition method in which PCA learning is performed only on superior data among the pose change based data sets and LDA learning is performed only on superior data among the training data set. EXP5 indicates a face recognition method in which PCA learning is performed only on superior data among the illumination change based data sets and LDA learning is performed only on the superior data among the training data set. EXP6 indicates a face recognition method in which PCA learning is performed on each subgroup and LDA learning is performed on the training data set. Referring to Table 2, EXP4 and EXP5 using a subgroup PCA and LDA learning method show higher search accuracy than EXP2 and EXP3 using a method concentrating on a particular data set. For example, EXP2 shows highest search accuracy with respect to the pose change based data sets but shows lowest search accuracy with respect to the other illumination change based data set, and EXP3 shows characteristics reverse to those shown in EXP2.

Figure 6:
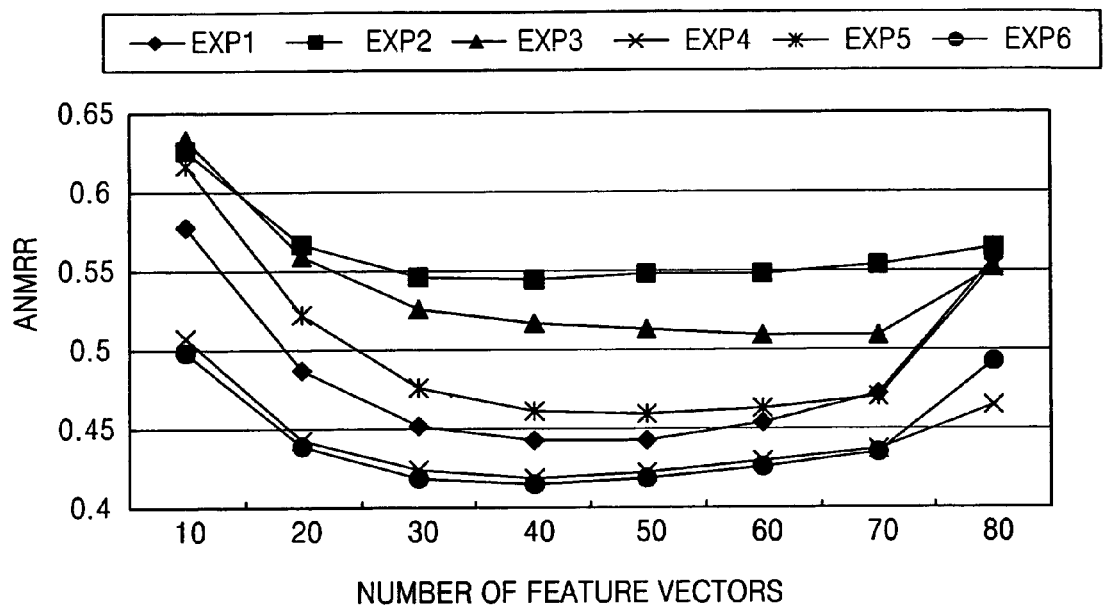
FIG. 6 is a graph illustrating changes in performance versus a number of feature vector sets used for an entire training data set in first through sixth experiments.

When face search accuracy is estimated in an Average Normalized Modified Retrieval Rate (ANMRR) while the number of feature vector sets used with respect to the training data set is changed in EXP1 through EXP6, results of the estimation can be expressed by a graph shown in FIG. 6. The ANMRR ranges from 0 to 1 and is in inverse proportion to the accuracy. Referring to FIG. 6, EXP6 using a learning method according to the present invention shows highest search performance.

Figure 7A:
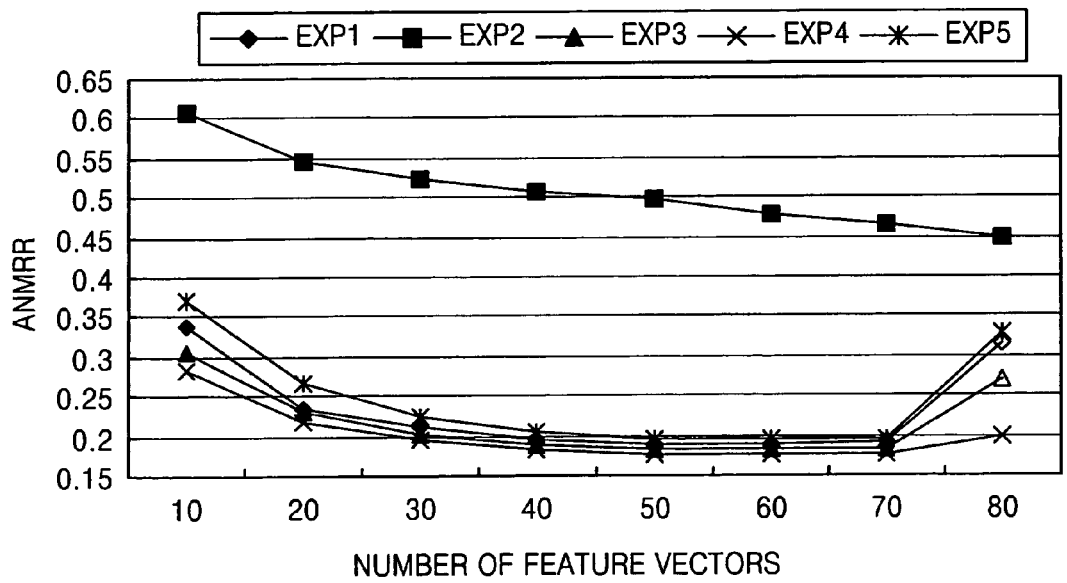
FIGS. 7A and 7B are graphs illustrating changes in performance versus the number of feature vector sets used for each subgroup in the first through fifth experiments.
Figure 7B:
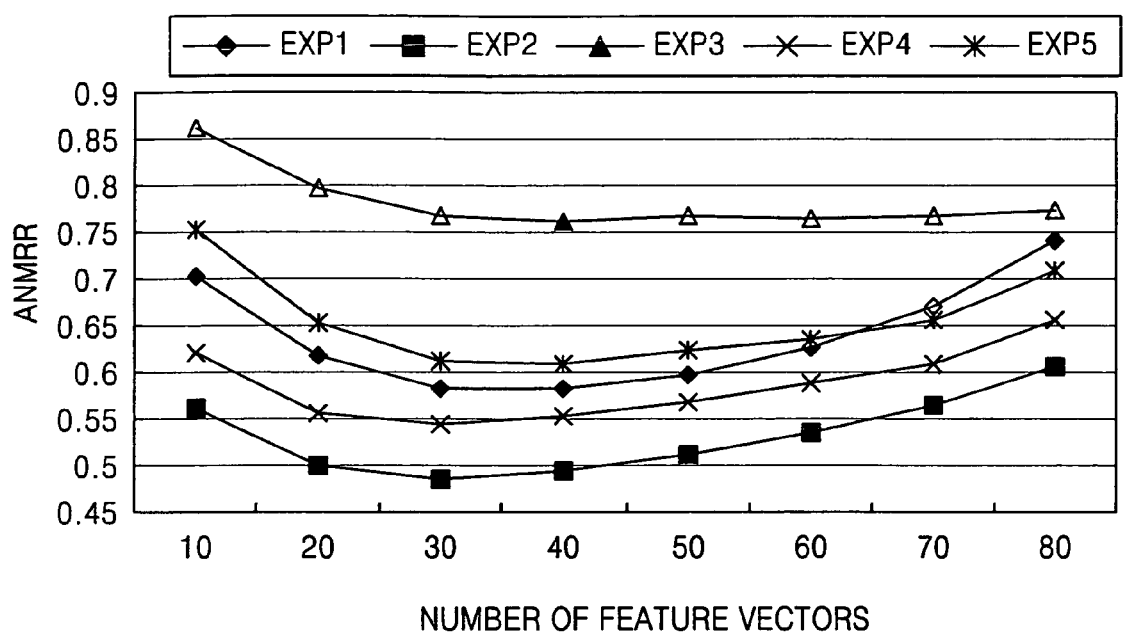

FIGS. 7A and 7B are graphs illustrating changes in performance versus the number of feature vector sets used for each subgroup in EXP1 through EXP5.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments accomplishing the present invention can be easily construed by programmers skilled in the art to which the present invention pertains.

As described above, according to an aspect of the present invention, PCA learning is performed on each of subgroups forming a training data set to generate a PCA basis vector set of each subgroup, then a PCA basis vector set of each subgroup is projected to the training data set, then LDA learning is performed on the training data set resulting from the projection to generate a PCLDA basis vector set of each subgroup, and then a feature vector set is extracted using a PCLDA basis vector set of each subgroup, so that eigen characteristics of each subgroup can be effectively reflected regardless of a data size of each subgroup. As a result, over fitting can be prevented, and entire face recognition performance can be improved.

In addition, an aspect of the present invention can provide reliable face recognition performance even in small-scale installation places where usual PCLDA is not effective due to a singularity problem.

Moreover, since a global data set and a local data set are classified into different subgroups in a training data set and a weight for each subgroup is determined such as to reflect features of an installation place, a face recognition system optimized to the installation place can be provided.

The present invention can be widely used for financial security, public security, harbor security, entrance/departure management at borders, identification in electronic votes, monitoring, preventing falsification of identity, search and inquiry for criminals, controlling access to important information, etc. at higher recognition accuracy than conventional technology.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus extracting a feature vector, comprising:
   a data classifier which classifies a training data set into a plurality of subgroups, wherein the subgroups include subgroups that are at least classified, from a global data set of the training data, to each have similar characteristic changes and the subgroups further include at least one subgroup that is classified from a local data set of the training data set, the global data set being obtained from a different source than the local data set;
   a Principal Component Analysis (PCA) learning unit which performs PCA learning on each of the subgroups to generate a PCA basis vector set of each of the subgroups;
   a projection unit which projects the PCA basis vector set of each of the subgroups to the training data set;
   a Linear Discriminant Analysis (LDA) learning unit which performs LDA learning on the training data set resulting from the projection to generate a PCA-based LDA (PCLDA) basis vector set of each of the subgroups; and
   a feature vector extraction unit which projects the PCLDA basis vector set of each of the subgroups to an input image and extracts a feature vector set of the input image with respect to each of the subgroups.

2. The apparatus of claim 1, further comprising a weight determination unit which determines a weight for each of the subgroups according to face recognition performance accomplished using the feature vector set of each of the subgroups.

3. A method of extracting a feature vector implemented by a feature vector extracting apparatus comprising a processor having computing device-executable instructions, the method comprising:
   classifying a training data set into a plurality of subgroups, wherein the subgroups include subgroups that are at least classified, from a global data set of the training data, to each have similar characteristic changes and the subgroups further include at least one subgroup that is classified from a local data set of the training data set, the global data set being obtained from a different source than the local data set;
   performing Principal Component Analysis (PCA) learning on each of the subgroups to generate a PCA basis vector set of each of the subgroups;
   projecting the PCA basis vector set of each of the subgroups to the training data set and performing Linear Discriminant Analysis (LDA) learning on a result of the projection to generate a PCA-based LDA (PCLDA) basis vector set of each of the subgroups; and
   projecting, by way of the processor, the PCLDA basis vector set of each of the subgroups to an input image and extracting a feature vector set of the input image with respect to each of the subgroups.

4. The method of claim 3, further comprising determining a weight for each of the subgroups according to face recognition performance accomplished using the feature vector set of each of the subgroups.

5. The method of claim 3, further comprising setting a weight for each of the subgroups according to a user's input.

6. A computer-readable recording medium including a program to control an implementation of a method of extracting a feature vector, the method comprising:
   classifying a training data set into a plurality of subgroups, wherein the subgroups include subgroups that are at least classified, from a global data set of the training data, to each have similar characteristic changes and the subgroups further include at least one subgroup that is classified from a local data set of the training data set, the global data set being obtained from a different source than the local data set
   performing Principal Component Analysis (PCA) learning on each of the subgroups to generate a PCA basis vector set of each of the subgroups;
   projecting the PCA basis vector set of each of the subgroups to the training data set and performing Linear Discriminant Analysis (LDA) learning on a result of the projection to generate a PCA-based LDA (PCLDA) basis vector set of each of the subgroups; and
   projecting the PCLDA basis vector set of each of the subgroups to an input image and extracting a feature vector set of the input image with respect to each of the subgroups.

7. A face recognition apparatus comprising:
   a learning unit which performs Principal Component Analysis (PCA) learning on each of a plurality of subgroups constituting a training data set, with the subgroups including subgroups that are at least classified, from a global data set of the training data, to each have similar characteristic changes, and the subgroups further including at least one subgroup that is classified from a local data set of the training data set, the global data set being obtained from a different source than the local data set, the learning unit further then performs Linear Discriminant Analysis (LDA) learning on the training data set, thereby generating a PCA-based LDA (PCLDA) basis vector set of each subgroup;
   a feature vector extraction unit which projects the PCLDA basis vector set of each subgroup to an input image and extracts a first feature vector set of the input image with respect to each subgroup;
   a feature vector storing unit which projects the PCLDA basis vector set of each subgroup to each of a plurality of face images to be registered, thereby generating a second feature vector set of each registered image with respect to each subgroup, and storing the second feature vector set in a database; and
   a similarity calculation unit which calculates a similarity between the input image and each registered image.

8. The face recognition apparatus of claim 7, further comprising a weight determination unit which determines a weight for each subgroup.

9. The face recognition apparatus of claim 8, wherein the weight for each subgroup is determined according to face recognition performance accomplished using the first and second feature vector sets.

10. The face recognition apparatus of claim 8, wherein the weight for each subgroup is determined according to a user's input.

11. The face recognition apparatus of claim 7, wherein the learning unit classifies the training data set into the plurality of subgroups, performs the PCA learning on each of the subgroups to generate a PCA basis vector set of each of the subgroups, projects the PCA basis vector set of each of the subgroups to the training data set, and performs the LDA learning on a result of the projection, thereby generating the PCLDA basis vector set of each of the subgroups.

12. The face recognition apparatus of claim 7, wherein the similarity calculation unit calculates a similarity between the first feature vector set of the input image with respect to each subgroup and the second feature vector set of each registered image with respect to each subgroup, multiplies the similarity by a weight for each subgroup, and adds results of multiplications performed with respect to each of the subgroups, thereby obtaining the similarity between the input image and the registered image.

13. A face recognition method implemented by a face recognition apparatus comprising a processor having computing device-executable instructions, the method comprising:

performing Principal Component Analysis (PCA) learning on each of a plurality of subgroups constituting a training data set, with the subgroups including subgroups that are at least classified, from a global data set of the training data, to each have similar characteristic changes, and the subgroups further including at least one subgroup that is classified from a local data set of the training data set, the global data set being obtained from a different source than the local data set, and then performing Linear Discriminant Analysis (LDA) learning on the training data set, thereby generating a PCA-based LDA (PCLDA) basis vector set of each of the subgroups;

projecting the PCLDA basis vector set of each of the subgroups to an input image and extracting a first feature vector set of the input image with respect to each of the subgroups;

projecting the PCLDA basis vector set of each of the subgroups to each of a plurality of registered images, thereby generating a second feature vector set of each registered image with respect to each of the subgroups, and storing the second feature vector set in a database; and calculating, by way of the processor, a similarity between the input image and each registered image.

14. The face recognition method of claim 13, wherein the performing of the Principal Component Analysis (PCA) learning on each of the plurality of subgroups constituting the training data set, and then performing the Linear Discriminant Analysis (LDA) learning on the training data set comprises:

classifying the training data set into the plurality of subgroups;

performing the PCA learning on each of the subgroups to generate a PCA basis vector set of each of the subgroups; and projecting a PCA basis vector set of each of the subgroups to the training data set and performing the LDA learning on a result of the projection to generate a PCLDA basis vector set of each of the subgroups.

15. The face recognition method of claim 14, wherein calculating the similarity between the input image and each registered image comprises:

calculating the similarity between the first feature vector set of the input image with respect to each of the plurality of subgroups and the second feature vector set of each registered image with respect to the subgroups; and multiplying the similarity by a weight for the subgroups and adding results of multiplications performed with respect to the subgroups, thereby obtaining the similarity between the input image and the registered image.

16. The face recognition method of claim 15, wherein the weight for each of the subgroups is determined according to face recognition performance accomplished using the first and second feature vector sets.

17. The face recognition method of claim 15, wherein a weight for each of the subgroups is determined according to a user's input.

18. A computer-readable recording medium including a program to control an implementation of a performing of a face recognition method, the method comprising:

performing Principal Component Analysis (PCA) learning on each of a plurality of subgroups constituting a training data set, with the subgroups including subgroups that are at least classified, from a global data set of the training data, to each have similar characteristic changes, and the subgroups further including at least one subgroup that is classified from a local data set of the training data set, the global data set being obtained from a different source than the local data set, and then performing Linear Discriminant Analysis (LDA) learning on the training data set, thereby generating a PCA-based LDA (PCLDA) basis vector set of each of the subgroups;

projecting the PCLDA basis vector set of each of the subgroups to an input image and extracting a first feature vector set of the input image with respect to each of the subgroups;

projecting the PCLDA basis vector set of each of the subgroups to each of a plurality of registered images, thereby generating a second feature vector set of each registered image with respect to each of the subgroups, and storing the second feature vector set in a database; and calculating a similarity between the input image and each registered image.

19. A face recognition method implemented by a face recognition apparatus comprising a processor having computing device-executable instructions, the method comprising:

performing Principal Component Analysis (PCA) learning on each of subgroups constituting a training data set to generate a PCA basis vector set of each of the subgroups, wherein the subgroups include subgroups that are at least classified from a global data set of the training data to each have similar characteristic changes, and the subgroups further include at least one subgroup that is classified from a local data set of the training data set, the local data set comprising face image data obtained at a same location where face images are recognized;

projecting the PCA basis vector set of each of the subgroups to the training data set;

performing Linear Discriminant Analysis (LDA) learning on the training data set resulting from the projection to generate a PCA-based LDA (PCLDA) basis vector set of each of the subgroups; and extracting, by way of the processor, a feature vector set using the PCLDA basis vector set of each of the subgroups, so that eigen characteristics of each of the subgroups is reflected regardless of a data size of each of the subgroups.

20. The face recognition method of claim 2, wherein the local data set comprises image data obtained at a same location where images are recognized.

21. The face recognition method of claim 20, wherein the weight determination unit allocates greater weight to the subgroup including the local data set than to the subgroup including the global data set in order to optimize the system to the characteristics of the location where images are recognized.

* * * * *

UNITED STATES PATENT AND TRADEMARK OFFICE
CERTIFICATE OF CORRECTION

| | |
|---|---|
| PATENT NO. | : 7,734,087 B2 |
| APPLICATION NO. | : 11/002082 |
| DATED | : June 8, 2010 |
| INVENTOR(S) | : Wonjun Hwang et al. |

It is certified that error appears in the above-identified patent and that said Letters Patent is hereby corrected as shown below:

Column 12, Line 3, change "set" to --set;--.

Signed and Sealed this

Sixteenth Day of November, 2010

David J. Kappos
*Director of the United States Patent and Trademark Office*